US012737201B2

(12) United States Patent
Rengan

(10) Patent No.: US 12,737,201 B2
(45) Date of Patent: Sep. 15, 2026

(54) SYSTEM AND METHOD OF NAVIGATING A DIGITAL PLATFORM WITH A CUSTOMIZED VIRTUAL ASSISTANT

(71) Applicant: Harihar Rengan, Dubai (AE)

(72) Inventor: Harihar Rengan, Dubai (AE)

( * ) Notice: Subject to any disclaimer, the term of this patent is extended or adjusted under 35 U.S.C. 154(b) by 0 days.

(21) Appl. No.: 19/270,080

(22) Filed: Jul. 15, 2025

(65) Prior Publication Data

US 2026/0169771 A1 Jun. 18, 2026

Related U.S. Application Data

(60) Provisional application No. 63/735,721, filed on Dec. 18, 2024.

(51) Int. Cl.

*G06F 3/048* (2013.01)
*G06F 3/16* (2006.01)
*G06F 9/451* (2018.01)
*G06F 9/54* (2006.01)
*G06F 40/40* (2020.01)

(52) U.S. Cl.

CPC .............. *G06F 9/453* (2018.02); *G06F 3/167* (2013.01); *G06F 9/547* (2013.01); *G06F 40/40* (2020.01)

(58) Field of Classification Search

CPC .......... G06F 9/453; G06F 40/40; G06F 3/167; G06F 9/547

See application file for complete search history.

(56) References Cited

U.S. PATENT DOCUMENTS 8,887,095 B2 11/2014 Krishnamurthy et al.
9,286,388 B2 3/2016 Marsh
11,477,265 B2 10/2022 McPhee et al.
11,789,696 B2 * 10/2023 Knapp .................... G10L 15/22 715/728
12,057,121 B2 * 8/2024 Nelson .................. G06F 16/685
12,205,578 B2 * 1/2025 Biadsy ................ G10L 15/1815
12,242,517 B2 * 3/2025 Behan ................... G06F 16/248
12,393,584 B2 * 8/2025 Popescu ............ G06F 16/24522
12,400,634 B2 * 8/2025 Baeuml ............... G06F 16/3329
12,411,871 B1 * 9/2025 Sullivan ................ G06F 16/285
12,499,892 B2 * 12/2025 Choi ........................ G10L 15/08
12,531,060 B2 * 1/2026 Lokanath ............ G10L 15/1822
2018/0101874 A1 4/2018 Laski
2023/0074406 A1 * 3/2023 Baeuml ............. G06F 16/90332
2024/0143289 A1 * 5/2024 Pandita ................... G10L 15/06
2024/0144922 A1 * 5/2024 Pandita ................... G10L 15/22
2024/0346566 A1 10/2024 Qin (Continued)

*Primary Examiner* — David Phantana-angkool

(57) ABSTRACT

A method and system of navigating a digital platform with a customized virtual assistant is provided. More specifically, a firm, with a digital platform such as a website, an app, a self-hosted app, and/or an API toolkit will be able to provide its users with a method to ask, by voice on an app/website, type on an app/website, and/or speak over an Interactive Voice Response (IVR) call, to access these entities. Further, the method may include prompting to enter at least one user query through a digital user interface. Further, the method may include retrieving a query response using an assistance engine, based on the user query. Further, the retrieving may be based on a contextually-aware Large Language Model. Further, the method may include outputting, using the assistance engine, and the query response to the digital platform.

15 Claims, 15 Drawing Sheets

(56) References Cited

U.S. PATENT DOCUMENTS

| | | | | |
|---|---|---|---|---|
| 2024/0412720 | A1* | 12/2024 | Vasylyev | G06F 16/90332 |
| 2024/0427568 | A1* | 12/2024 | Pandita | G06F 8/33 |
| 2025/0021767 | A1* | 1/2025 | Dharnidharka | G06F 16/90332 |
| 2025/0217425 | A1* | 7/2025 | Gollapudi | G06F 16/9535 |
| 2025/0252477 | A1* | 8/2025 | Konakalla | G06V 20/66 |
| 2025/0272317 | A1* | 8/2025 | Aggarwal | G06F 16/3329 |
| 2025/0278752 | A1* | 9/2025 | Chen | G06Q 30/0202 |
| 2025/0306916 | A1* | 10/2025 | Chiricescu | G06F 8/35 |
| 2025/0308398 | A1* | 10/2025 | D'Agostino | G06F 40/40 |
| 2025/0356851 | A1* | 11/2025 | Pandita | G10L 15/183 |

* cited by examiner (A) Providing a digital user interface, an assistance engine, and digital platform information managed by a computing system (B) Prompting to activate the assistance engine through the digital user interface (C) Prompting to enter at least one user query through the digital user interface, if the assistance engine is selected to be activated through the digital user interface (D) Retrieving a query response to the user query with the contextually-aware large language model by referencing the digital platform information with the knowledge-basing process, if the user query is entered through the digital user interface (E) Outputting the query response with the digital user interface

FIG. 2

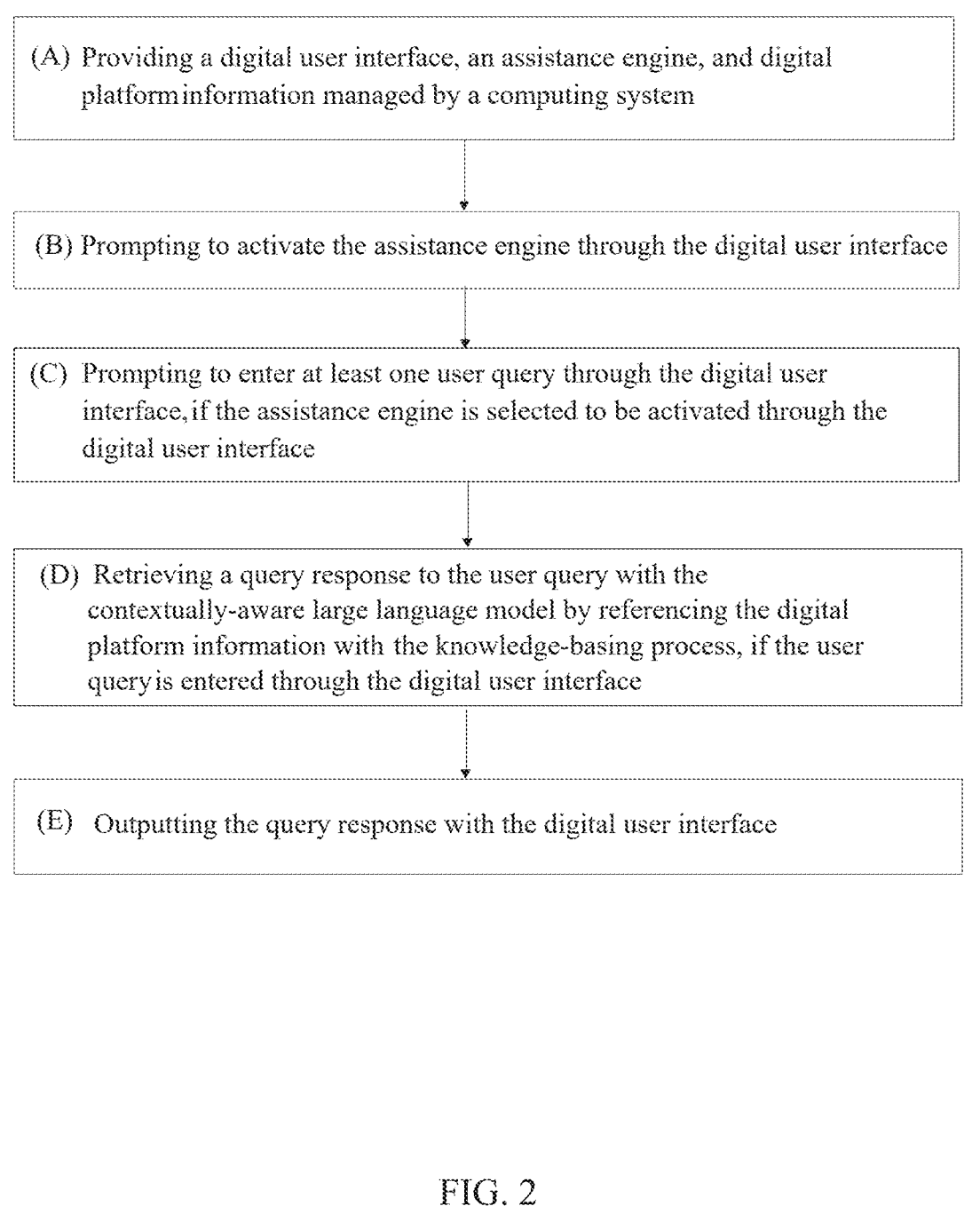

Fully self-contained local LLM, contextual information, and application code

SYSTEM AND METHOD OF NAVIGATING A DIGITAL PLATFORM WITH A CUSTOMIZED VIRTUAL ASSISTANT

The current application claims a priority to the U.S. provisional patent application Ser. No. 63/735,721 filed on Dec. 18, 2024.

FIELD OF THE INVENTION

The present invention generally relates to a method of navigating a digital platform with a customized virtual assistant. More specifically, the present invention relates to methods, systems, apparatuses, and devices for facilitating provisioning of digital content.

BACKGROUND OF THE INVENTION

Currently, customers navigate digital platforms by performing several steps to reach the desired page where the customer's requested information is available. For example, the customer may come to a bank's digital platform and may want to know about a specific product. The customer may have to traverse a set of predefined paths from one page to another, eventually reaching the destination page. This navigation is inefficient.

For the customer, this becomes a deterrent in adopting digital platforms. Examples of digital platforms include, but are not limited to, a website, an app, a self-hosted app, and/or an interactive voice response (IVR) system. The customer will have to remember so many paths and details every time he needs to get his required information. This holds back digital adoption, which every company wants to drive. Customers may still struggle to get their information online and end up visiting physical locations of the company or calling their service center.

Most companies are dealing with spiraling expenses and are finding ways to reduce or optimize their physical footprint and reduce employee costs from service centers. In addition, customers find it very inconvenient and time-consuming to get what they need non-digitally.

A customer's time is limited amongst the various digital platforms that he uses for most of his everyday needs because most activities are digitally enabled. Therefore, customers demand that they be able to access their destination pages faster.

Because running other non-digital channels is expensive for the companies, companies incentivize their staff in service centers or in their automated voice systems or keep literature in their physical locations urging customers to go online. Some companies even incentivize customers to go online. As digital platforms become more customer-friendly, adoption of these platforms becomes natural.

Therefore, there is a need for improved methods, systems, apparatuses, and devices for facilitating provisioning digital content that may overcome one or more of the above-mentioned problems and/or limitations.

SUMMARY OF THE INVENTION

The present disclosure provides a method of provisioning digital content. In other words, a method of navigating a digital platform with a customized virtual assistant is provided. More specifically, a firm, with a digital platform such as a website, a software application, a self-hosted app, and/or an API toolkit will be able to provide its users with a method to ask, by voice on an app/website, type on an app/website, and/or speak over an Interactive Voice Response (IVR) call, to access these entities. The users may ask the website to be redirected to a specific page, ask over the phone to send a specific statement by email, or type into an app asking to be shown a filled or even submitted form.

In other words, the method may include prompting to enter at least one user query through a digital user interface. Further, the method may include retrieving a query response using an assistance engine, based on the user query. Further, the retrieving may be based on a contextually-aware Large Language Model. Further, the method may include outputting, using the assistance engine, and the query response to the digital platform.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

FIG. 2 is a flowchart illustrating an overall process for the method of the present invention.

FIG. 8 is a block diagram illustrating a single server configuration of the system of the present invention.

DETAILED DESCRIPTION OF THE INVENTION

Figure 1:
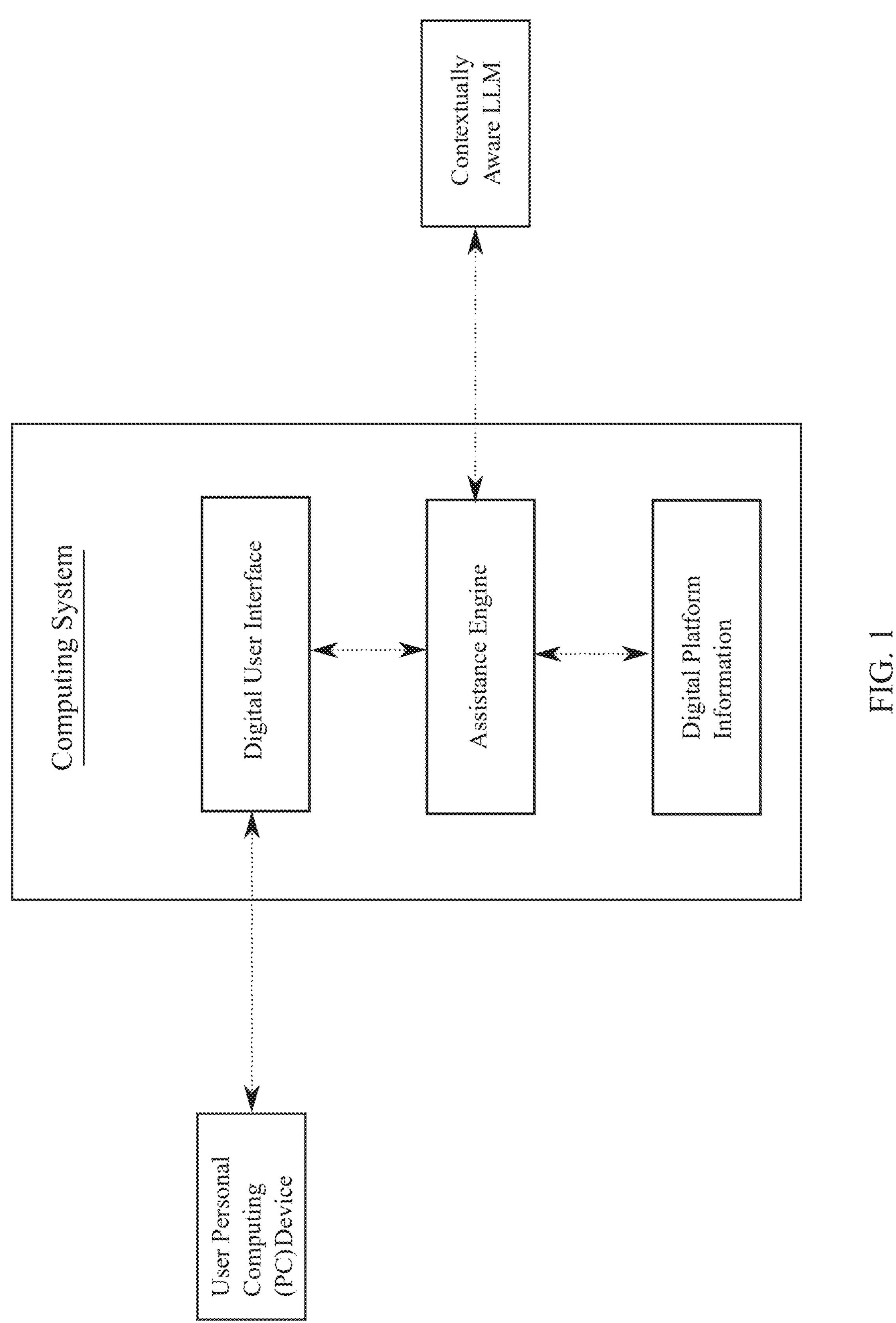
FIG. 1 is a block diagram illustrating the system of the present invention.

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and is made merely for the purposes of providing a full and enabling disclosure. The detailed disclosure herein of one or more embodiments is not intended, nor is it to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denote "at least one" but do not exclude a plurality unless the contextual use dictates otherwise. When used herein to join a list of items, "or" denotes "at least one of the items" but does not exclude a plurality of items of the list. Finally, when used herein to join a list of items, "and" denotes "all of the items of the list".

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of the disclosed use cases, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g., a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data finger-printing, role-based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g., username, password, passphrase, PIN, secret question, secret answer, etc.) and/or possession of a machine readable secret data (e.g., encryption key, decryption key, bar codes, etc.) and/or or possession of one or more embodied characteristics unique to the user (e.g., biometric variables such as, but not limited to, fingerprint, palm-print, voice characteristics, behavioral characteristics, facial features, iris pattern, heart rate variability, evoked potentials, brain waves, and so on) and/or possession of a unique device (e.g., a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g., transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

In reference to FIG. 1 through FIG. 15, the present invention is a system and method for navigating a digital platform with a customized virtual assistant.

In order to accomplish the above-described functionality, the system used to implement the present invention is provided with a digital user interface, an assistance engine, and a digital platform information managed by a computing system (Step A). The digital user interface is the digital platform that can be virtually navigated by a user. Examples of the digital user interface include, but are not limited to a website, an app, a self-hosted app, an IVR (interactive voice response) call, etc. The assistance engine is a combination of at least one software module and/or at least one algorithm that work in tandem to execute the method of the present invention. The digital platform information may be any accessible information related to the digital user interface, such as stored data, application/webpage links, etc. The computing system may be a locally hosted application or at least one server that is used to execute most steps for the method of the present invention and is used as a hub to manage and exchange information. Moreover, the computing system may be used to execute a number of internal processes for the present invention and may also be used to store user information. Further, the assistance engine is operatively implemented with a contextually-aware large language model (LLM). An LLM is a type of AI (artificial intelligence) model, specifically a deep learning algorithm, trained on vast amounts of text data. A contextually-aware LLM is an LLM that is operatively conditioned with at least one knowledge-basing process. The knowledge-basing process is a technique that enhances the output of large language models (LLMs) by supplementing their knowledge with information retrieved from external sources. For example, instead of relying solely on the LLM's pre-trained knowledge, knowledge-basing processes such as a RAG (retrieval augmented generation) process may be used to condition the LLMs, so as to incorporate data from knowledge bases, databases, or other sources that help to generate more accurate, up-to-date, and relevant responses.

Furthermore, the digital user interface is accessible via a user personal computing (PC) device. The user PC device allows a user to interact with the present invention. Examples of user PC device include, but is not limited to, a smartphone, a laptop, a desktop, a keypad phone, a tablet PC, any interactive electronic device, etc.

As can be seen in FIG. 2, now that the system used to execute the method of the present invention has been described, it is possible to adequately describe an overall process for the method of the present invention. The overall process begins by prompting to activate the assistance engine through the digital user interface (Step B). This is the step where a user accesses the present invention on the digital user interface. To that end, the assistance engine may be activated by pressing any virtual or physical operational tool such as a microphone icon, a phone keypad, a chat icon, etc. This step helps the user to initiate a connection with the assistance engine or the present invention and consequently helps to easily navigate through the digital platform.

The overall process continues by prompting to enter at least one user query through the digital user interface, if the assistance engine is selected to be activated through the digital user interface (Step C). The user query may be any voice, text, or interactive command(s) that the user may want to know, such as a specific webpage link, or any information related to the digital user interface. In other words, the user could ask the website to be redirected to a specific page or ask over the phone to be sent a specific statement by email, or type into an app asking to be shown a filled or even submitted form. The overall process continues by retrieving a query response to the user query with the contextually-aware large language model by referencing the digital platform information with the knowledge-basing process, if the user query is entered through the digital user interface (Step D). According to the preferred method, the LLM will be made context-aware by initially providing the LLM with some data about the digital user interface. In other words, the method may execute Step D with the computing system by dynamically mapping the user query through the knowledge-basing process. Dynamic mapping allows for flexible and adaptive relationships between inputs and outputs, often based on real-time conditions or user interactions. After receiving the user query, the contextually-aware LLM returns the appropriate identifier, or answer, or aid with the user's query. The method may further execute Step D with the computing system by statically mapping the user query through the digital platform information. In static mapping, the association between inputs and outputs is predetermined and does not change. In other words, static mapping is predetermined and remains constant, whereas dynamic mapping adapts to changing conditions or user input.

In the preferred embodiment, the knowledge-basing process is a retrieval augmented generation process (RAG). However, the knowledge-basing process may be any other conditioning process that is known to one of ordinary skill in the art, such as a finetuning process.

The overall process continues by outputting the query response with the digital user interface (Step E). In other words, the present invention enables the user to access/retrieve/receive relevant information about the user query related to the digital user interface in an efficient manner through the query response. For example, the query response may be a webpage identifier, wherein the webpage identifier is selected from a group consisting of: a uniform resource locator (URL), a uniform resource identifier (URI), an application programming interface (API) endpoint, and an application webpage identifier. In other words, the query response could be a URL, URI, callable API URL, an identifier for a page on the app, and much more. In another example, the query response is a webpage action, wherein the webpage action is executed with at least one specific API. API access refers to the ability to use an API to interact with a service or platform. This access is granted through a set of rules and mechanisms defined by the API provider, specifying how developers can authenticate, what data and functionality they can access, and how to interact with the API.

Figure 4:
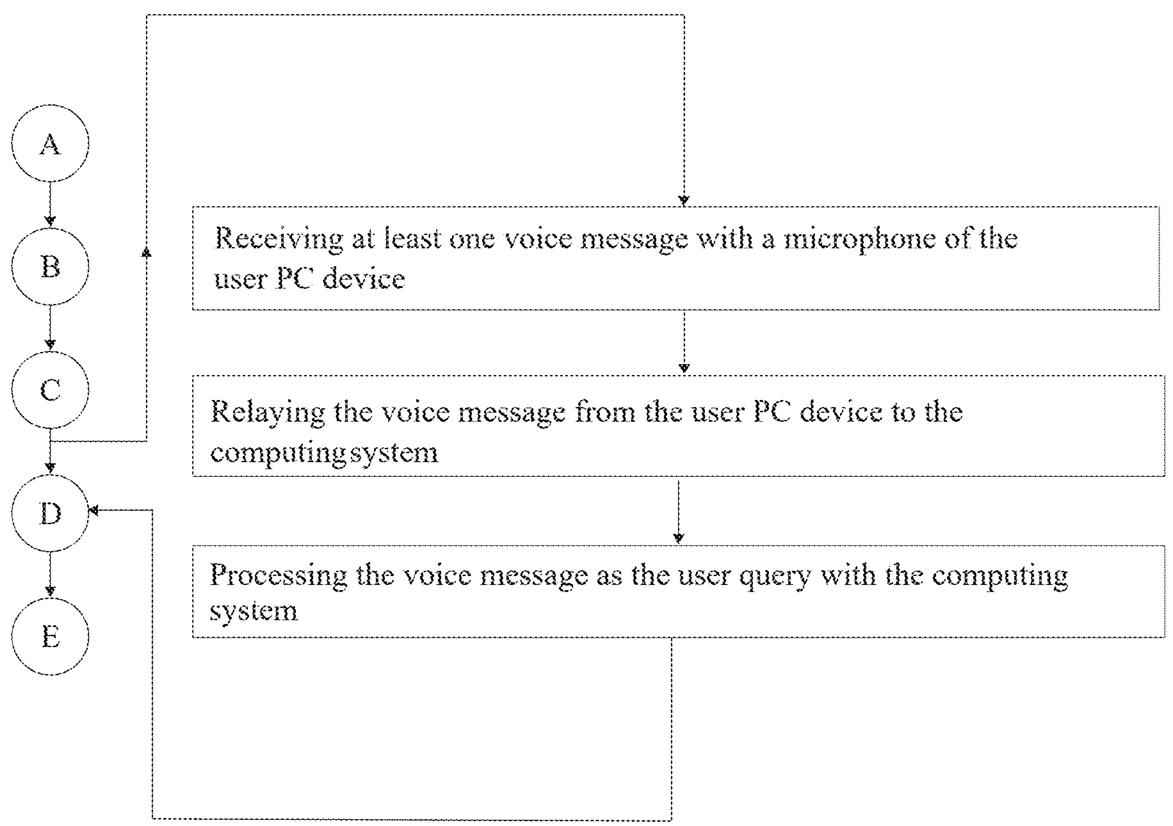
FIG. 4 is a flowchart illustrating a subprocess for entering a user query through a voice message.

In reference to FIG. 4, a preferred method of the present invention implements a subprocess for entering the user query during Step C. This subprocess begins by receiving at least one voice message with a microphone of the user PC device after Step C. The voice message may include any commands, details, information, or query that the digital user interface has access to. Further, this subprocess continues by relaying the voice message from the user PC device to the computing system, followed by processing the voice message as the user query with the computing system before Step D. In other words, this subprocess of the present invention allows a user to speak any query into the microphone of the user PC device, and this audio data received through the microphone is recorded as the voice message.

Figure 5:
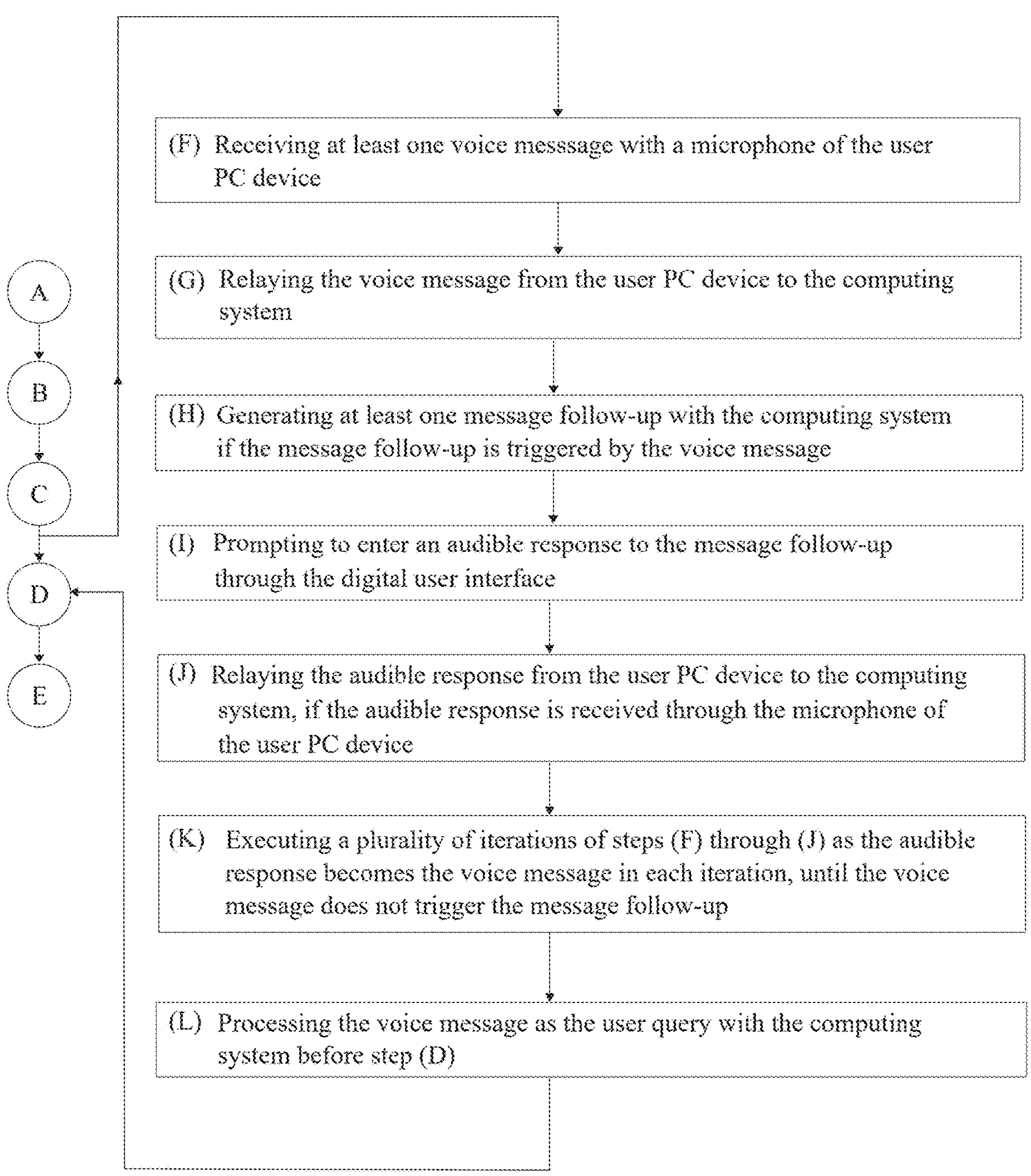
FIG. 5 is a flowchart illustrating a subprocess for entering a user query through an interactive voice response (IVR) call.

In reference to FIG. 5, a preferred method of the present invention implements a different subprocess for entering the user query during Step C. In this embodiment, the user query is entered over an Interactive Voice Response (IVR) call. To that end, this subprocess begins by receiving at least one voice message with a microphone of the user PC device after Step C (Step F). The first voice message is sent by the user. This subprocess continues by relaying the voice message from the user PC device to the computing system (Step G). Further, the subprocess continues by generating at least one message follow-up with the computing system, if the message follow-up is triggered by the voice message (Step H). The message follow-up may include any voice message that the computing system outputs for the user in response to the voice message. In other words, the user receives a response to the first voice message from the computing system. This subprocess continues by prompting to enter an audible response to the message follow-up through the digital user interface (Step I). The audible response is the reply that the user says in response to the message follow-up. This interactive back and forth messages sent between the user PC device and the computing system allow the user and the assistance engine to essentially communicate with each other and to consequently narrow down to a correct version of the user query. This subprocess further continues by relaying the audible response from the user PC device to the computing system, if the audible response is received through the microphone of the user PC device (Step J). Furthermore, any number of such interactions may happen between the user (through the user PC device) and the computing system. Accordingly, this subprocess continues by executing a plurality of iterations of Steps F through J as the audible response becomes the voice message in each iteration, until the voice message does not trigger the message follow-up (Step K). Thus, a combination of all the exchanged messages contributes to the user query. In other words, this subprocess continues by processing the voice message as the user query with the computing system before Step D (Step L).

Figure 6:
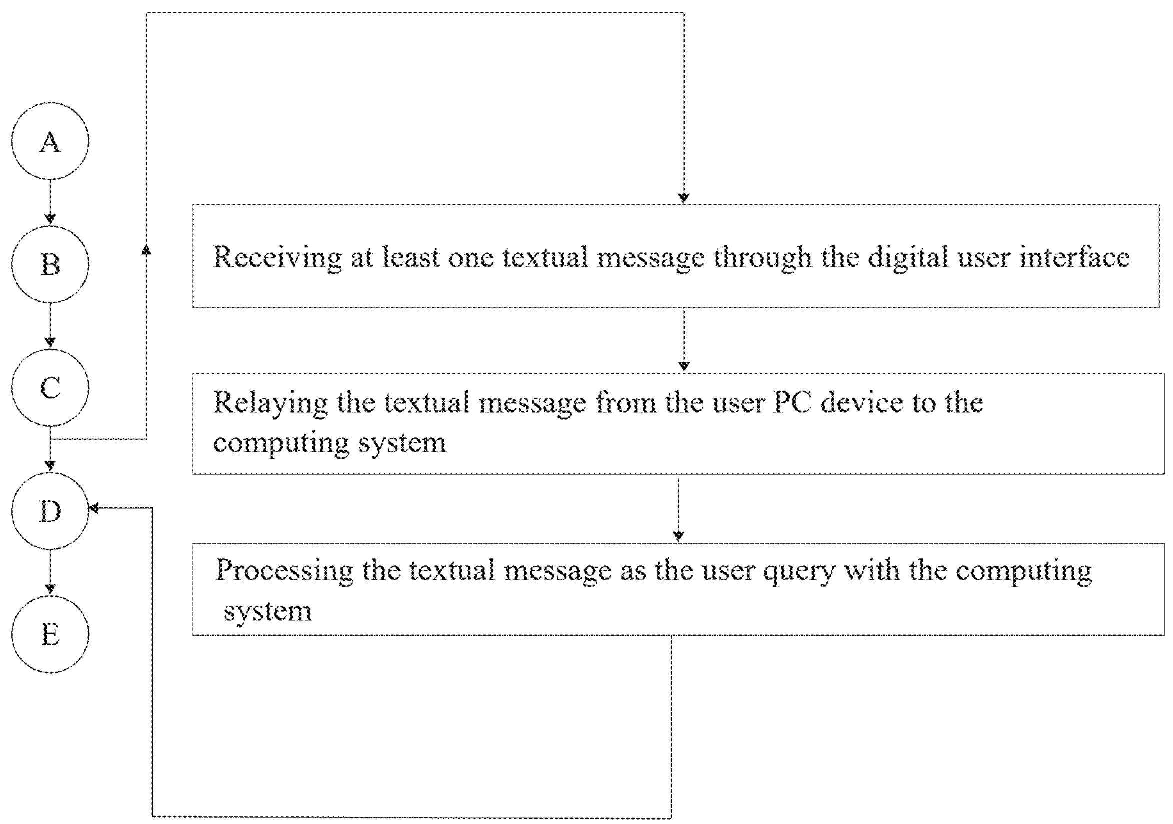
FIG. 6 is a flowchart illustrating a subprocess for entering a user query through a text message.

In reference to FIG. 6, a preferred method of the present invention implements a different subprocess for entering the user query during Step C. In this embodiment, the user query is entered through text messages. Accordingly, this subprocess begins by receiving at least one textual message through the digital user interface after Step C. The at least one textual message is any text message that the user has entered on the online user interface through the assistance engine. This subprocess continues by relaying the textual message from the user PC device to the computing system. Further, this subprocess continues by processing the textual message as the user query with the computing system before Step D. In other words, the entered text message is accepted as the user query by the assistance engine.

According to the preferred method, different types of computing systems may be utilized depending on the online user interface and the user PC device.

Figure 7:
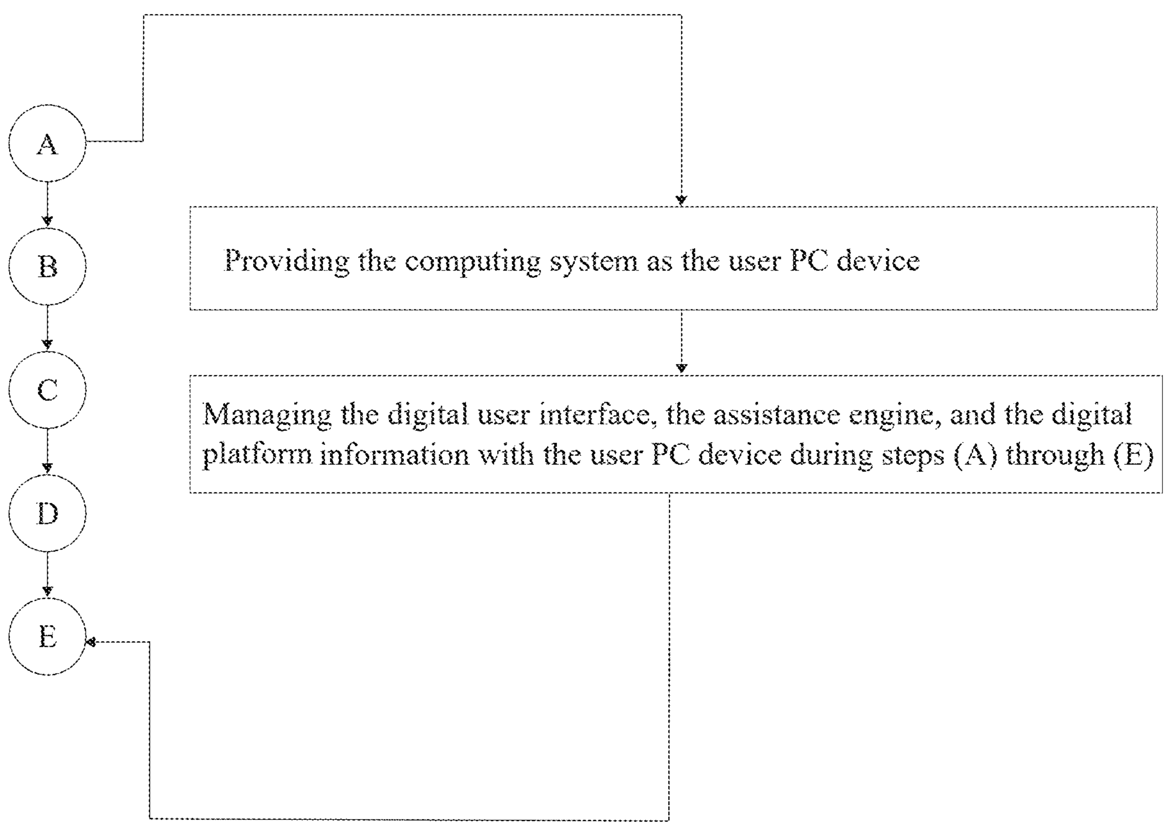
FIG. 7 is a flowchart illustrating a subprocess for the method of the present invention, wherein the computing system is the user PC device.

In reference to FIG. 7, in one embodiment, a subprocess of the overall method provides the computing system as the user PC device. This relates to a scenario where the digital user interface is a locally-managed application. In this case, all the details of the locally-managed application as well as any user queries may be accessed within the user PC device itself. Thus, this subprocess continues by managing the digital user interface, the assistance engine, and the digital platform information with the user PC device during Steps A through E. In other words, the entire steps of the method may be managed by the user PC device, which is the computing system in this scenario.

Figure 8:
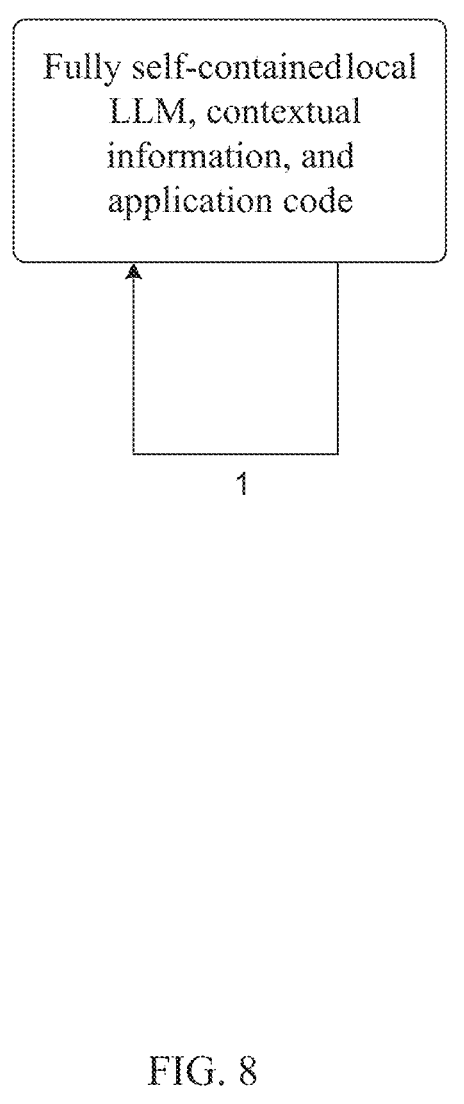
Figure 9:
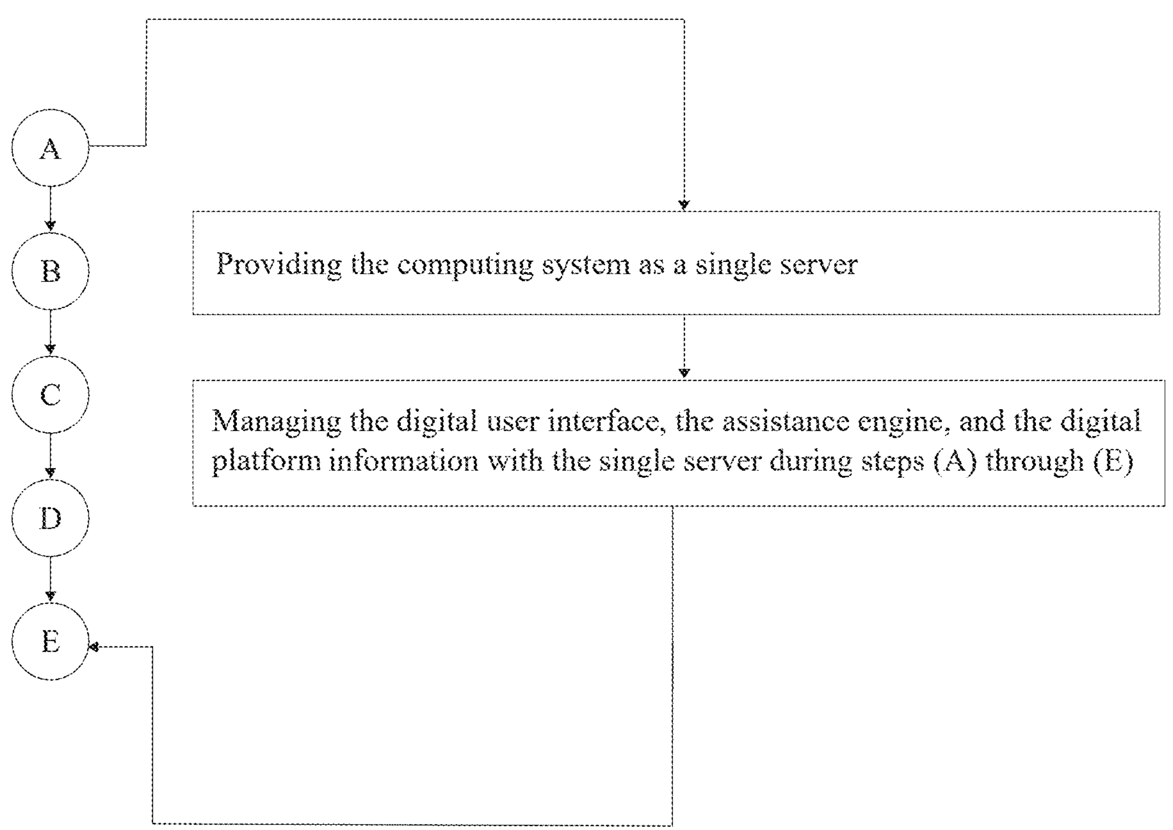
FIG. 9 is a flowchart illustrating a subprocess for the method of the present invention, wherein the computing system is a single server.

In reference to FIG. 8 and FIG. 9, in another embodiment, a subprocess of the overall method begins by providing the computing system as a single server. As seen in FIG. 8, in this case, only a single server operates as the computing system, or the single server manages a fully-self-contained local LLM, contextual information and application code. In other words, this subprocess continues by managing the digital user interface, the assistance engine, and the digital platform information with the single server during Steps A through E.

Figure 10:
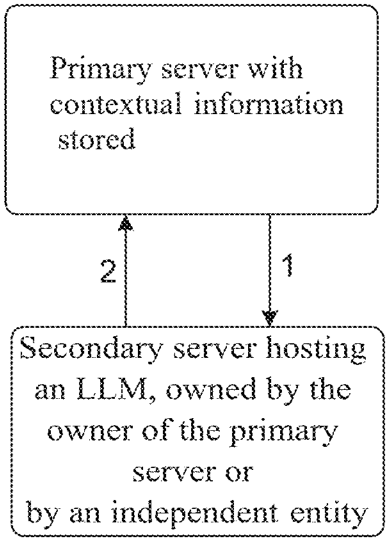
FIG. 10 is a block diagram illustrating a configuration of the system of the present invention, wherein a primary server and a secondary server act as the computing system.
Figure 11:
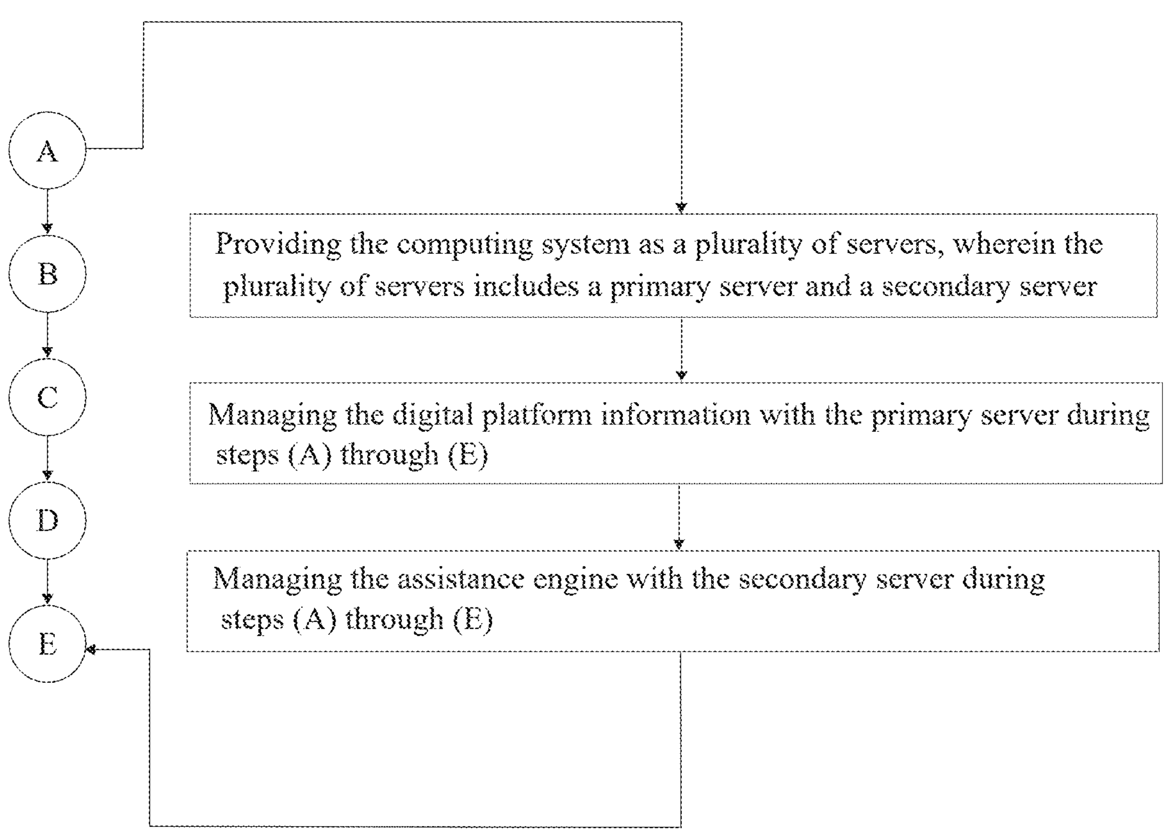
FIG. 11 is a flowchart illustrating a subprocess for the method of the present invention, wherein the computing system includes a primary server and secondary server.

In reference to FIG. 10 and FIG. 11, a subprocess of the overall method provides the computing system as a plurality of servers, wherein the plurality of servers includes a primary server and a secondary server. In other words, more than one server is used, and each server may be assigned for performing different functions. Accordingly, this subprocess continues by managing the digital platform information with the primary server during Steps A through E. That is, the primary server stores the contextual information. Further, this subprocess continues by managing the assistance engine with the secondary server during Steps A through E. In other words, the secondary server hosts the LLM, which may be owned by the owner of the primary server or by an independent entity.

Figure 12:
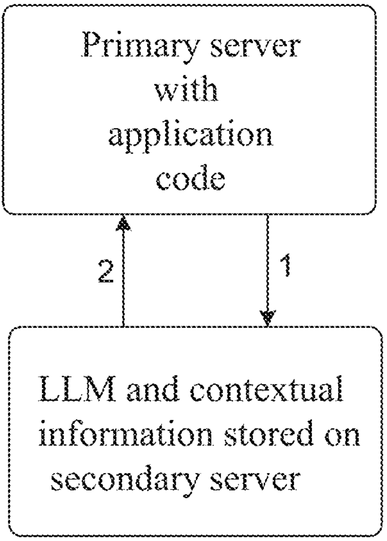
FIG. 12 is a block diagram illustrating a configuration of the system of the present invention, wherein a primary server with the application code and a secondary server with the LLM act as the computing system.
Figure 13:
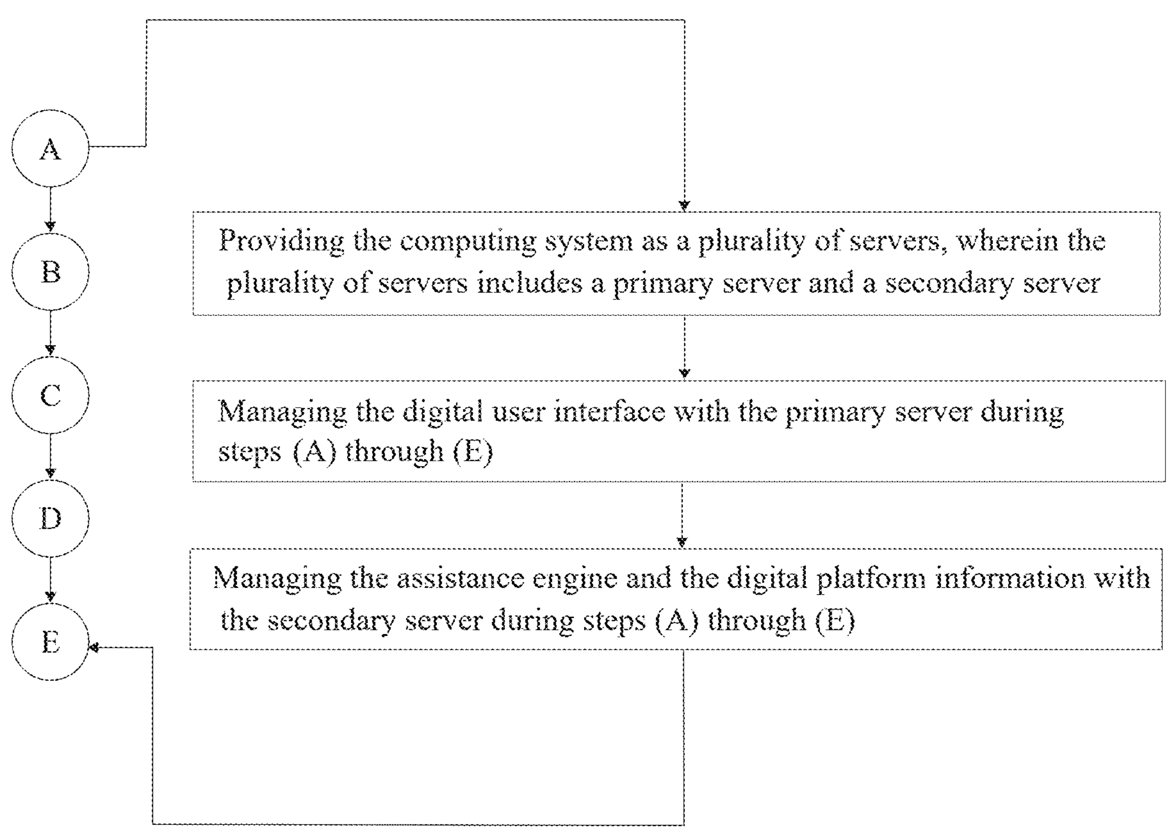
FIG. 13 is a flowchart illustrating a subprocess for the method of the present invention, wherein the computing system includes a primary server and secondary server.

In reference to FIG. 12 and FIG. 13, in another embodiment, a subprocess of the overall method provides the computing system as a plurality of servers, wherein the plurality of servers includes a primary server and a secondary server. This subprocess continues by managing the digital user interface with the primary server during Steps A through E. That is, the application code is managed by the primary server. Further, this subprocess continues by managing the assistance engine and the digital platform information with the secondary server during Steps A through E. In other words, the LLM and contextual information are stored on the secondary server.

Figure 14:
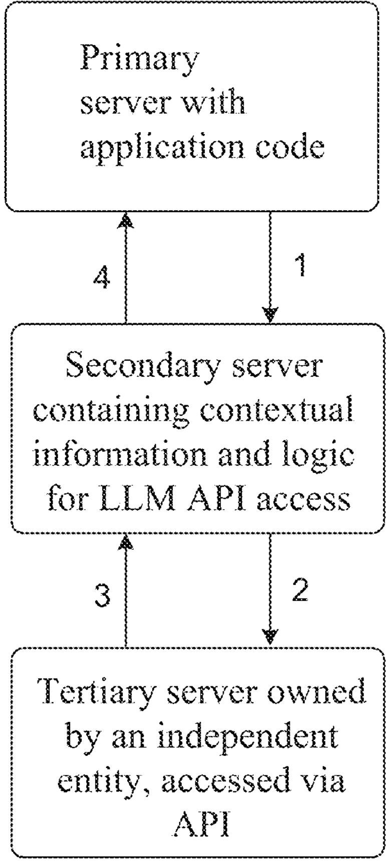
FIG. 14 is a block diagram illustrating a configuration of the system of the present invention, wherein a primary server, a secondary server, and a tertiary server act as the computing system.
Figure 15:
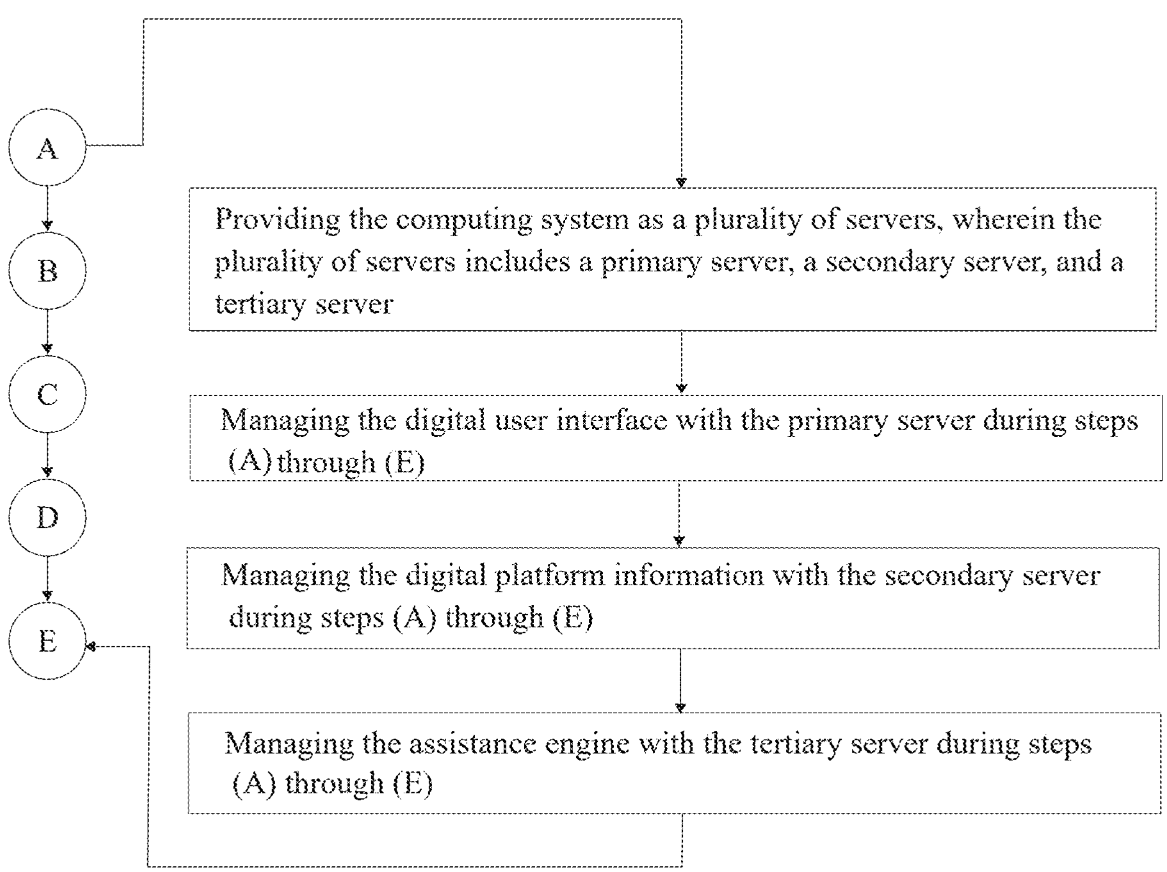
FIG. 15 is a flowchart illustrating a subprocess for the method of the present invention, wherein the computing system includes a primary server, a secondary server and a tertiary server.

In reference to FIG. 14 and FIG. 15, in another embodiment, a subprocess of the overall method provides the computing system with a plurality of servers, wherein the plurality of servers includes a primary server, a secondary server, and a tertiary server. This subprocess continues by managing the digital user interface with the primary server during Steps A through E. That is, the application code is managed by the primary server. This subprocess continues by managing the digital platform information with the secondary server during Steps A through E. Also, in this embodiment, the secondary server contains contextual information and logic for LLM API access. This subprocess continues by managing the assistance engine with the tertiary server during Steps A through E. In this case, the tertiary server manages an external LLM owned by an independent entity, which may be accessed by the API.

Thus, with the present invention, a customized virtual assistance system catering to the needs of the firm or the digital user interface may be provided for users to help with easy access and navigation across the digital user interface.

Figure 3:
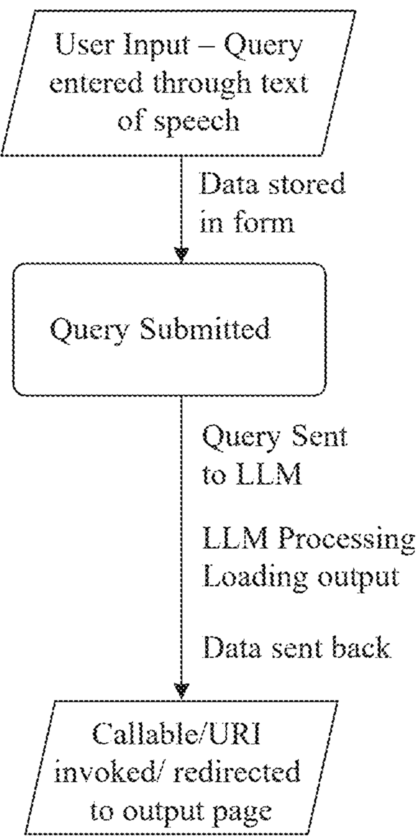
FIG. 3 is a block diagram illustrating a generalized user interaction flow.

In reference to FIG. 3, an overall overview of the system's process may be described as follows:

1) The user provides a query.
2) The assistance engine relays this to the LLM.
3) The LLM, which, with its knowledge-basing and context-awareness, provides the identifier that would match, answer, or aid with the user's query. This could also be many LLMs, working together to formulate a URL with the needed arguments for examples, such as /savings?rates=4&principal=5000&holder=john, or formulate many identifiers, but in the most basic case, it would be as outlined.
4) The relayed output will use this identifier in some meaningful way to help the user.

Although the invention has been explained in relation to its preferred embodiment, it is to be understood that many other possible modifications and variations can be made without departing from the spirit and scope of the invention as hereinafter claimed.

What is claimed is:

1. A method of navigating a digital platform with a customized virtual assistant, the method comprising the steps of:

(A) providing a digital user interface, an assistance engine, and digital platform information managed by a computing system, wherein the assistance engine is operatively implemented with a contextually-aware large language model, and wherein the contextually-aware large language model is operatively conditioned with at least one knowledge-basing process, and wherein the knowledge-basing process is configured to source external information into the contextually-aware large language model, and wherein the digital user interface is a digital platform configured to be virtually navigated by a user, and wherein the digital platform information is any information accessible through the digital user interface, and wherein the digital user interface is accessible via a user personal computing (PC) device, and wherein the digital platform is a website with a plurality of navigable webpages, and wherein the website is functionally independent from the contextually-aware large language model;

(B) prompting to activate the assistance engine through the digital user interface by displaying a virtual microphone icon, a virtual phone keypad, a virtual chat icon, or a combination thereof with the user PC device;

(C) prompting to enter at least one user query through the digital user interface, if the assistance engine is selected to be activated through the digital user interface, wherein the user query is at least one voice message and/or at least one textual message;

(D) retrieving a query response to the user query with the contextually-aware large language model by referencing the digital platform information with the knowledge-basing process, if the user query is entered through the digital user interface, wherein the contextually-aware large language model and the digital platform information are functionally independent from each other, and wherein the query response is mapped through the digital platform information by the contextually-aware large language model, and wherein the query response includes a webpage identifier and/or a webpage action;

(E) outputting the query response with the digital user interface;

sequentially executing steps (B) through (E);

hosting a specific webpage associated with the webpage identifier through the user PC device after step (E), if the query response includes the webpage identifier; and executing the webpage action for a specific webpage with the user PC device after step (E), if the query response includes the webpage action.

2. The method as claimed in claim 1 comprising the steps of:

receiving the voice message with a microphone of the user PC device after step (C);

relaying the voice message from the user PC device to the computing system; and processing the voice message as the user query with the computing system before step (D).

3. The method as claimed in claim 1 comprising the steps of:

(F) receiving the voice message with a microphone of the user PC device after step (C);

(G) relaying the voice message from the user PC device to the computing system;

(H) generating at least one message follow-up with the computing system, if the message follow-up is triggered by the voice message;

(I) prompting to enter an audible response to the message follow-up through the digital user interface;

(J) relaying the audible response from the user PC device to the computing system, if the audible response is received through the microphone of the user PC device;

(K) executing a plurality of iterations of steps (F) through (J) as the audible response becomes the voice message in each iteration, until the voice message does not trigger the message follow-up; and (L) processing the voice message as the user query with the computing system before step (D).

4. The method as claimed in claim 1 comprising the steps of:

receiving the textual message through the digital user interface after step (C);

relaying the textual message from the user PC device to the computing system; and processing the textual message as the user query with the computing system before step (D).

5. The method as claimed in claim 1, wherein the webpage identifier is selected from a group consisting of: a uniform resource locator (URL), a uniform resource identifier (URI), an application programming interface (API) endpoint, and an application webpage identifier.

6. The method as claimed in claim 1, wherein the webpage action is executed with at least one specific API.

7. The method as claimed in claim 1 comprising the step of:

executing step (D) with the computing system by statically mapping the user query through the digital platform information.

8. The method as claimed in claim 1 comprising the step of:

executing step (D) with the computing system by dynamically mapping the user query through the knowledge-basing process.

9. The method as claimed in claim 1, wherein the knowledge-basing process is a retrieval augmented generation process.

10. The method as claimed in claim 1, wherein the knowledge-basing process is a finetuning process.

11. The method as claimed in claim 1 comprising the steps of:

providing the computing system as the user PC device; and managing the digital user interface, the assistance engine, and the digital platform information with the user PC device during steps (A) through (E).

12. The method as claimed in claim 1 comprising the steps of:

providing the computing system as a single server; and managing the digital user interface, the assistance engine, and the digital platform information with the single server during steps (A) through (E).

13. The method as claimed in claim 1 comprising the steps of:

providing the computing system as a plurality of servers, wherein the plurality of servers includes a primary server and a secondary server;

managing the digital platform information with the primary server during steps (A) through (E); and managing the assistance engine with the secondary server during steps (A) through (E).

14. The method as claimed in claim 1 comprising the steps of:

providing the computing system as a plurality of servers, wherein the plurality of servers includes a primary server and a secondary server;

managing the digital user interface with the primary server during steps (A) through (E); and managing the assistance engine and the digital platform information with the secondary server during steps (A) through (E).

15. The method as claimed in claim 1 comprising the steps of:

providing the computing system as a plurality of servers, wherein the plurality of servers includes a primary server, a secondary server, and a tertiary server;

managing the digital user interface with the primary server during steps (A) through (E);

managing the digital platform information with the secondary server during steps (A) through (E); and managing the assistance engine with the tertiary server during steps (A) through (E).

* * * * *